United States Patent [19]
Jones et al.

[11] Patent Number: 5,838,634
[45] Date of Patent: Nov. 17, 1998

[54] METHOD OF GENERATING 3-D GEOLOGIC MODELS INCORPORATING GEOLOGIC AND GEOPHYSICAL CONSTRAINTS

[75] Inventors: Thomas A. Jones, Bellaire; Sterling J. Helwick, Jr., Houston, both of Tex.

[73] Assignee: Exxon Production Research Company, Houston, Tex.

[21] Appl. No.: 760,951

[22] Filed: Dec. 9, 1996

Related U.S. Application Data

[60] Provisional application No. 60/014,817 Apr. 4, 1996.
[51] Int. Cl.⁶ .............................. G01V 1/34; G01V 1/30
[52] U.S. Cl. ..................... 367/73; 364/413.13; 364/421
[58] Field of Search ........................ 367/73; 364/413.13, 364/413.15, 413.18, 421, 422, 804, 806

[56] References Cited

U.S. PATENT DOCUMENTS

| | | | |
|---|---|---|---|
| 4,679,174 | 7/1987 | Gelfand . | |
| 4,953,142 | 8/1990 | Rimmer | 367/73 |
| 4,972,383 | 11/1990 | Lailly | 367/73 |
| 5,321,612 | 6/1994 | Stewart | 364/420 |
| 5,487,001 | 1/1996 | Neff . | |
| 5,583,825 | 12/1996 | Carrazzone et al. | 364/421 |
| 5,638,269 | 6/1997 | Fournier et al. | 364/422 |

OTHER PUBLICATIONS

Ouenes, A., SPE 28415, Application of Simulated Annealing and Other Global Optimization Methods to Resevoir Description: Myths and Realities, 1994 SPE Annual Technical Conference & Exhibition.

Robein, E., The Use of Inversion in Lithostratigraphic Interpretation—an Integrated Approach, pp. 265–273, 13th World Petroleum Congress, 1991.

(List continued on next page.)

*Primary Examiner*—Nelson Mosokowitz
*Attorney, Agent, or Firm*—Albert B. Kimball, Jr.; Keith A. Bell

[57] ABSTRACT

Features of subsurface earth reservoirs of interest are made available for analysis and evaluation by forming three-dimensional, geologic block models based on field data. The field data include geological observations, such as lithofacies and porosity values obtained from well data and other sources, as well as geophysical data, usually from seismic surveys. The geologic models representative of subsurface reservoirs so obtained are optimized to match as closely as feasible geologic constraints known or derived from observed geologic data. The models also conform to geophysically based constraints indicated by seismic survey data. The modeled geologic lithofacies and porosity are converted into acoustic velocity and bulk density values, which are then formulated as a seismic response which is then compared with actual seismic data. A perturbation process on lithofacies and porosity can be iteratively repeated until a representation of the reservoir is obtained which is within specified limits of accuracy or acceptability.

32 Claims, 5 Drawing Sheets

OTHER PUBLICATIONS

Sen, M.K., *Geophysics: The Leading Edge of Exploration*, vol. 11, pp. 27–29, Jan. 1992.

Sen, M.K., *Geophysics*, vol. 56, No. 10, pp. 1624–1638, Oct. 1991.

Stoffa, P.L., *Journal of Seismic Exploration*, vol. 1., pp. 9–27, 1992.

Verbeek, N.H., Genetic Algorithms for Inversion of Single Channel Seismic Data, EAEG 56th Meeting and Technical Exhibition, Jun. 1994.

Widess, M.B., *Geophysics*, vol. 47, No. 8, pp. 1160–1173, 1982.

Zhu, H., *Geostatistics Troia' 92*, pp. 1–12, 1992.

The SLIM Method, Meshing Geology, geophysics, *Western Oil World*, pp. 13–14, Jul. 1987.

Hays, McAulay and Shurtleff, Abstract, 1981.

Jones, T.A., *Geobyte*, pp. 14–20, Feb. 1988.

Jones, T.A., Extensions to three dimensions: Introduction to the section on 3–D geologic block modeling, Computer Modeling of Geologic Surfaces and Volumes (D. E. Hamilton and T. A. Jones, editors): Amer. Assoc. Petroleum Geology, Tulsa, pp. 175–182, 1992.

Jones, T.A., Contouring Geologic Surfaces With the Computer, Chapter 4, Simple Grids and Contour Maps, pp. 43–59, 1986.

Journel, A.G., *Mathematical Geology*, vol. 18, No. 1, pp. 119–140, 1986.

Journel, A.G., Integrating Seismic Data in Resrevoir Modeling: The collacated Cokriging Alternative, Stanford Center for Reservoir Forecasting, School of Earth Sciences, pp. 1–34, 1992.

Kallweit, R.S., *Geophysics*, vol. 47, No. 7, pp. 1035–1046, 1982.

Kirkpatrick, S., *Science*, vol. 220, No. 4598, pp. 671–680, May 1983.

Koefoed, O., *Geophysical Prospecting*, pp. 21–30, 1981.

Lindseth, R.O., *Geophysics*, vol. 44, No. 1, pp. 3–26, Jan. 1979.

Metropolis, N., *The Journal of Chemical Physics*, vol. 21, No. 6, pp. 1087–1092, Jun. 1953.

Nguyen, T., An Integrated Approach for Reservoir Characterization, Norsk Petroleum–forening Biennal Geophysical Seminar, Mar. 1990.

Oldenburg, D.W., *Geophysics*, vol. 48, No. 10, pp. 1318–1337, Oct., 1983.

Doyen, P., Porosity from Seismic Data: A Geostatistical Approach, *Geophysics*, V. 53, pp. 1263–1275, 1988.

Dubrule, O., Geostatistics: A Way Towards Data Integration and Uncertainty Quantification, 14th World Petroleum Congress, vol. 2, pp. 265–275, 1994.

Duijndam, A.J.W., *Geophysical Prospecting*, vol. 36, 878–898. 1988.

Farmer, C.L., Numerical Rocks, *The Mathematics of Oil Recovery*, pp. 437–447, 1989.

Fuchs, K., *Geophys. J.R. astr. Soc.*, vol. 23, pp. 417–433, 1971.

Gancarski, S., The Pseudo–Well Technique—A Tool for Statistical Calibration of Seismic Data in a Field with Limited Well Control, EAEG 56th Meeting and Technical Exhibition, 1994.

Gelfand, V.A., *Geophysics:The Leading Edge of Exploration*, pp. 30–35, 1984.

Gluck, S., Robust Multichannel Stratigraphic Inversion of Stacked Data, Developments in Geophysical Techniques related to finding The Subtle Trap, Norway, Norwegian Petroleum Society, 1990.

Gregory, A.R., Aspects of Rock Physics From Laboratory and Log Data that are Important to Seismic Interpretation, *Seismic Stratigraphy Applications to Hydrocarbon Exploration*, American Assn. of Petroleum Geologists, pp. 14–46, 1977.

Haas, A., *First Break*, vol. 12, No. 11, pp. 561–569, 1994.

Hampson, D., *Geophysics: The Leading Edge of Exploration*, pp. 39–42, Jun. 1991.

Allan, W., Waveform Inversion of Wide–Angle Seismic Data Using Global Optimisation Techniques, EAEG–55th Meeting & Technical Exhibition, Jun. 1993.

Araktingi, SPE 24752, pp. 913–926, 1992.

Bamberger, A., Geophysics, vol. 47, pp. 757–770, May 1982.

Bortoli, L., Selection of Stochastic Reservoir Models Using Iterative Forward Matching of Seismic Traces, pp. 1–27, May 1992.

Bortoli, L., Constraining Stochastic Images to Seismic Data, *Geostatistics Troia '92*, vol. 1, pp. 325–337, 1992.

Denver, L.E., The Impact of Vertical Averaging on Hydrocarbons Volumetric Calculations—A Case Study, Computer Modeling of Geologic Surfaces and Volumes (D.E. Hamilton and T. A. Jones, editors): Amer. Assoc. Petroleum Geology, Tulsa, pp. 219–234, 1992.

Deutsch, C.V., The Application of Simulated Annealing to Stochastic Reservoir Modelign, SPE Advanced Technology Series, vol. 2, No. 2, pp. 222–227, Apr. 1994.

Doyen, P.M., Lithology Predition from Seismic Data, a Monte–Carlo Approach, Reservoir Characterization II, pp. 557–564, 1991.

Doyen, P.M.,Seismic Discrimination of Lithology and Porosity, A Monte Carlo Approach, *Reservoir Geophysics*, pp. 243–250, 1992.

Doyen, P.M., Seismic Discrimination of Lithology in Sand/ Shale Reservoirs: A Bayesian Approach, Society of Exploration Geophysicists, Expanded Abstracts with Biographies, pp. 719–722, 1989.

*Computers & Geosciences*, vol. 14, No. 1, pp. 135–138, 1988.

AAPG Bulletin, v. 69, n. 2, 1985.

*Geobyte*, Feb. 1988, pp. 14–20.

SPE 18321. pp. 585–594, 1988.

Chapter 13, 1992 AAPG Book, Computer Modelling of Geologic Surfaces & Volumes.

1994 SEG Meeting, Extended Abstract "R", pp. 1–2.

The American Association of Petroleum Geologists Bulletin, V. 67, No. 9, Sep. 1983, pp. 1415–1421.

*Mathematical Geology*, vol. 21, No. 3, 1989, pp. 271–283.

Helwick et al, 64th Annu. SFG.Int. Org., Oct. 28, 1994, pp. 1674–1675; Abst. Only Herewith.

Smith–Rauch et al, Annu. AAPG–SAPM–BOMD– DAA–DRG Con., Mar. 8, 1995, P 89A; Abst. Herewith.

Johnson et al, 63rd Annu SPE TEch Conf., Oct. 5, 1988, pp. 585–594; Abstract Herewith.

Jones, T.A., Math Geol., vol. 21, #3, pp. 271–283 Apr. 1989, Abst. Only Herewith.

METHOD OF GENERATING 3-D GEOLOGIC MODELS INCORPORATING GEOLOGIC AND GEOPHYSICAL CONSTRAINTS

This application claims the benefit of U.S. provisional application Ser. No. 60/014,817, filed Apr. 4, 1996.

BACKGROUND OF INVENTION

1. Field of Invention

This invention relates to three-dimensional geologic modeling and description of subsurface reservoirs of interest.

2. Description of Prior Art

A. Introduction

There has been and still exists a continuing need to evaluate subsurface reservoirs as to their internal characteristics, size and extent, as well as their likely content of hydrocarbons. This has been the case even where there are producing wells present in the reservoir. It has been common practice to obtain data about the reservoir from well logging instruments moved through existing wells in the reservoir. Such well data obtained from the well through well logs of various types typically represent data samples from only a small fraction of a reservoir's volume.

For effective evaluation of a reservoir, knowledge of the actual rock formation (lithology or lithofacies) and the contained fluids, as well as the relative presence or volume of pore space (or its porosity), is needed. The fact that a reservoir exhibits certain lithofacies and porosity at a well provides no assurances that other areas of the reservoir have the same characteristics. Geological models of lithofacies and porosity that are based solely on well data thus contain large regions that are not based on actual sampled data; rather, the data must be estimated from information obtained from the closest existing wells.

Three-dimensional seismic surveys provide data samples over most of a reservoir's volume, including portions unsampled by wells, but they can at best provide only indirect measurements of lithofacies and porosity. Existing seismic surveying technology does not offer techniques to measure either of these formation characteristics directly.

B. Geologic Modeling

Geologic modeling of the subsurface (usually three-dimensional, or 3-D) has been performed for many years by petroleum and mining geologists, engineers, and hydrologists. Many descriptive or static 3-D geologic models built for mining or petroleum applications have been in the form of a specified three-dimensional array of individual model units or blocks (also called cells). An entire set of blocks has constituted the geologic model and thus represented the subsurface volume of interest. Each individual block has represented a specifically allocated portion of the subsurface, so the blocks may not overlap or intercut each other. Dimensions of the blocks are typically chosen so that the rock properties are relatively homogeneous within a block, yet without requiring an excessive number of blocks for the model. Typical blocks are one foot to one meter in thickness. Most commonly, blocks are square or rectangular in plan view and have thickness that is either constant or variable. The objective of a geologic modeling process is to assign rock properties to each block in the geologic model. This process has commonly used, so far as is known, the following three data types:

1. Rock property data from wells: The well data include such properties as lithofacies (i.e., facies particularly characterized by rock type) or porosity (i.e., percentage of pore space that a rock contains). In some situations, lithofacies may be synonymous with lithology (e.g., limestone, dolomite, sandstone, or shale); in others, two rocks may have the same lithology, but actually have been deposited in different sedimentary facies. Other variables, such as permeability, digitized well logs, and ore grade, have been commonly used. The characteristic of this type of data is that the observations constitute strings of information along the borehole.

2. Structural surfaces or horizons in the form of 2-D computer grids or meshes: Structural surfaces or horizons in the subsurface, which were commonly modeled by computer grids, limit the top and base of the model and define the volume of rock being modeled. They have also defined the boundaries of zones within the model. These grids typically marked stratigraphic surfaces that defined individual sequences that comprised the formation interval being modeled. These grids have been generated through well-known procedures by one of several commercially available software programs.

3. Stratigraphic surfaces in the form of 2-D computer grids or meshes: These grids defined geologic correlations across a model within each zone; that is, they indicated those portions of the model that correlated laterally (block-to-block, or well-to-block). These grids may also have been used to define model blocks by specifying the tops and bases of the blocks. If it were desired that orientations and thicknesses of blocks follow stratigraphic configurations and relationships (e.g., conformable, truncation, baselap), then these grids would be used to form such blocks.

Stratigraphic surfaces were also used to define the stratigraphic position of blocks within a zone. For a zone in which beds were deposited parallel to a flooding surface, surfaces of constant stratigraphic position would be equidistant from this flooding surface. In this case, a group of blocks that were a given thickness above or below that surface would have the same relative-Z coordinate, which is the vertical distance from the flooding surface to the block. On the other hand, if deposition were conformable within a zone, that is, conformable to the zone's top and base, surfaces of constant stratigraphic position were distributed proportionally between the top and base of the zone. All blocks that were positioned a fixed percentage of the zone thickness above the zone base (or below the zone top) would have the same relative-Z coordinate.

The geologic modeling process used these three types of data to assign values of the rock properties of interest to all blocks within the geologic model. The assignment of a rock property to a block was typically a three-step process known to practitioners of geologic modeling:

1. The X—Y position of the block and its Z-coordinate, both in absolute elevation and relative to stratigraphic surfaces, were determined.

2. Search algorithms were used to determine which data points were in the neighborhood of the block. Two criteria were important. The data has to be from a portion of the well that was correlative to the block being modeled, and the data had to be near in some sense (typically geographic) to the block.

3. The value or rock property that was to be assigned to the block was calculated using one of several classes of estimation methods, including the following:

(a) Distance-based methods. These methods were based on simple measures of distance to the well from the block. Nearest-neighbor or polygonal methods assigned to the block the rock property value of the nearest data value.

Averaging methods interpolated the block property by calculating a weighted average of nearby data values. The weight assigned to each data value typically was a function of the inverse distance between the data value and the block.

(b) Geostatistical methods. These methods took into account both distance and spatial continuity of the rock property. The three-dimensional continuity of a rock property might be captured by a semi-variogram, which quantified the variability of the rock property as a function of separation distance and direction. Common usage was to use the simpler term variogram, rather than semi-variogram, and that term is used in the remainder of the present application. This measure of continuity might be in the form of calculated values based on observed data or in the form of special mathematical functions. Variogram values could be calculated on observations as follows:

$$\gamma(h)=\Sigma\{Z(x)-Z(x+h)\}^2/2n,$$

where $\gamma$ is the variogram value, h is a vector indicating separation distance and direction, $Z(x)$ is the rock property value at location x, $Z(x+h)$ is the rock property value at location x+h, the sum is over all pairs of observations separated by h, and n is the number of pairs of values in the sum.

The separation distance could be calculated in any direction. Vertical separation distances typically were calculated perpendicular to the ground surface, but in many instances, vertical variograms were calculated in terms of depth down a well. Horizontal variograms were calculated parallel to sea level; more commonly, horizontal (or more appropriately, lateral) variograms were calculated following stratigraphic surfaces or correlations. Mathematical functions could be fitted to these calculated $\gamma(h)$ values observations or the values might be used as calculated.

Deterministic geostatistical methods, such as kriging, were averaging methods that assigned weights to data as a function of distance and the variogram model.

Probabilistic geostatistical methods, such as sequential Gaussian simulation and sequential indicator simulation, produced geologic models that reproduced the continuity specified in the variogram model. Since the order in which blocks were estimated affected rock property assignment, a 3-D random path typically was used. This process could produce a suite of geologic models for the property being modeled, with each model being theoretically equi-probable.

Geologic-modeling studies traditionally used seismic data only to define the structural surfaces that limit the top and base of the geologic model. These traditional geologic modeling studies have only rarely taken advantage of the rock property information contained in seismic data, and those that match seismic traces do not merge geologic and geophysical principles.

C. Seismic Inversion

Seismic inversion techniques have been used to predict the nature of the subsurface from seismic traces. There have been two primary inversion strategies: operator-based inversion, and model-based inversion. Inversion techniques typically relied on layer-type models of the subsurface, in contrast to the block models discussed above.

Operator-based inversion was the traditional approach to seismic inversion and assumed that the seismic-acquisition process transformed the subsurface geology into a seismic trace by introducing a seismic pulse into the subsurface. Computer algorithms were used to reverse the seismic-acquisition process and produce a model of the subsurface geology. The disadvantage of this approach was that seismic processes generally could not be reversed with sufficient accuracy to allow characterization of subsurface reservoirs.

Model-based inversion did not require reversal of the seismic-acquisition process. Instead, it required that numerous forward seismic models be generated until a reasonable match existed with the observed seismic data. The generation of a single forward seismic model was performed by generating a synthetic seismic trace from a stacked series of layers. Forward-modeling procedures worked with acoustic impedance values (the product of acoustic velocity and bulk density) rather than with the lithofacies and porosity values which were used in geologic modeling. This process involved using seismic-impedance values to calculate reflection coefficients at the interfaces between layers. Synthetic seismic traces were calculated by convolving the reflection coefficients with a specified seismic pulse.

Model-based inversion was performed to invert one-dimensional seismic traces by iteratively calculating forward seismic models. This approach was also used to invert a 2-D seismic line for an initial 2-D model of layers of varying thickness. Acoustic velocity and bulk density values were assigned at selected control points within each layer. Acoustic velocity and density values were interpolated between control points at trace locations. The parameters at control points were allowed to vary over specified ranges, and synthetic seismic traces were calculated for each change in the model. Parameters were varied until synthetic seismic traces were in agreement with observed seismic traces. This approach required a good starting model because the final model is very close to the starting model.

The use of simulated annealing to estimate the acoustic velocity and bulk density of a one-dimensional series of stacked layers was also proposed. Forward seismic modeling was used to generate a synthetic seismic trace. Simulated annealing was applied in this one-dimensional optimization procedure, one trace at a time. This process used only two constraints: the distribution of acoustic velocity and that of bulk density. The annealing process began by establishing an initial model with a series of layer density and velocity values. These values were systematically perturbed until a synthetic seismic trace calculated for the model matched the observed seismic trace. Statistics such as correlations and mean-square errors were used to quantify the mismatch between the synthetic and observed seismic traces. Perturbations that improved the match were generally accepted, although some perturbations that degraded the match were accepted in order to avoid local minima.

Such an optimization procedure produced a one-dimensional model that was not constrained by within-trace, vertical correlations for acoustic velocity, bulk density, or acoustic impedance. In addition, while the process could be used to invert a 3-D seismic cube of traces, each inversion would be performed independently, one trace at a time, thereby not taking into account the lateral correlations in properties that were known to exist between traces. In contrast to geologic modeling techniques, seismic inversion techniques did not take advantage of available rock property data, such as lithofacies and porosity, and their continuity, for the subsurface region of interest.

D. Geologic Modeling That Integrates Seismic Data

A number of recently proposed techniques have attempted to combine geologic modeling and seismic inversion, thereby attempting to avoid the limitations of each technique. The potential benefits offered are demonstrated by considering a typical subsurface model. In a typical geologic modeling study, well data sampled less than 0.1 percent of the model volume. That well data was the most direct measurement of the volume. In other words, more than 99.9 percent of the block properties had to be estimated from less direct measurements. For example, where available, 2-D and 3-D seismic surveys represented an abundant source of less direct measurement data. Seismic surveys contained information not only on the surfaces that defined the reservoir, but also on properties of the rock that comprise the reservoir. By integrating seismic data with well data, it was suggested that one could expand substantially the information used to estimate block values.

Sequential approaches to producing geologic models modeled one rock property at a time following a specific order. The model of the first rock property (say, lithofacies) was used as a guide for producing a model for the second rock property (say, porosity), and so on.

A number of approaches to integrating seismically derived lithofacies and porosity into 3-D geologic models have been proposed. These approaches indirectly or directly integrated seismic information with well data in estimating block values for the geologic model. However, the approaches have not taken into account detailed information contained in the seismic trace, and as a result synthetic seismic traces that may have been calculated from the resulting geologic model have not been assured to match observed seismic traces.

Methods that indirectly integrated seismic information used a sequential approach with the seismic data to group the blocks in the model into seismic facies. Values for blocks within each seismic facies were estimated separately using only the well data contained within that facies. This approach produced block values for lithofacies and/or porosity.

Several geostatistical approaches attempted to make more direct use of the seismic data in the geologic modeling process. These approaches required an initial calibration step in which a relation was established between well data and neighboring seismic traces. Seismic attributes that characterized the shape of the seismic trace over a defined interval were correlated with well data over the same interval. Linear regression or discriminant function analysis could be used to develop relations for predicting rock properties from seismic attributes. These relations were used to convert observed seismic traces to a rock property (e.g., porosity).

Several methods have been developed to integrate well data with these seismically derived rock properties. A cokriging approach allowed porosity models to be generated that honored well data and integrated seismically derived porosity by accounting for the covariance relationships between well data and seismic information. Variations on cokriging, including Markov-Bayes simulation and collocated cokriging, have been developed in order to improve the efficiency of the geologic modeling process. These geostatistical approaches treated well data as primary (hard) data and seismic information as secondary (soft) information. Geostatistical methods could also be used as part of a sequential approach and could be applied to interpreted facies, one at a time.

Geostatistical methods have also been developed that integrate seismic traces. These were a geostatistics-based process for building geologic models that matched seismic traces, using the following steps:

First, it was necessary to obtain log-derived impedance at each well and seismic impedances for all traces in the seismic survey. Next, an analyst would assign well data and seismic-amplitude values to those vertical stacks of blocks nearest the well and seismic data. The process then continued in the following sequence:

1. Determine variogram models that characterize the vertical and lateral continuity of impedance.
2. Select a random X—Y location.
   a) Establish a random path through the vertical stack of blocks at this location.
   b) Use sequential Gaussian simulation to estimate the impedance of each block, using nearby well data and values from previously calculated blocks.
   c) Calculate a synthetic seismic trace for this set of block estimates.
   d) Repeat this process until a specified number of sets of block estimates was available.
   e) Select the set of block values whose synthetic seismic trace correlated best with the actual seismic trace. Use these block impedance values as data for estimating other block values in neighboring parts of the model.

Continue processing until blocks at all X—Y locations have been estimated.

3. Use linear regression to transform impedance values to a single petrophysical variable such as porosity.

This process produced a reasonable geologic model when a single rock property was responsible for the impedance values and when impedance values paralleled stratigraphic surfaces. More commonly, however, impedance values were dependent on several rock properties, each with its own degree and direction of preferred continuity. Some of these properties, such as lithofacies and porosity, were correlated parallel to stratigraphic surfaces. Other properties, such as fluid saturation, were not correlated parallel to stratigraphic surfaces. Therefore, this process that estimated impedance values rather than rock properties might not produce a model that was consistent with the interpreted geology.

This geostatistics-based process was described for modeling a single zone and did not address the need to model multiple zones, each with its own stratigraphic correlations and impedance continuity. In order to accurately model the geology using matches to seismic traces, however, several such zones typically had to be modeled simultaneously. In addition, the trace-matching component of this process required that block values be estimated by following a random path in two dimensions, simulating one vertical column of blocks at a time, rather than by following a preferable 3-D random path. As a result, this approach reproduced vertical impedance continuity information better than it reproduced lateral continuity.

SUMMARY OF INVENTION

Briefly, the present invention provides a new and improved process to build 3-D geologic models of the earth's subsurface that primarily represent petroleum reservoirs and/or aquifers, although it may also be used for other geologic applications. This process merges 3-D geologic modeling with forward seismic modeling and, thereby, is able to produce geologic models that are consistent with both geologic and geophysical principles. The process accounts for geologic information by modeling rock properties that are distributed in three dimensions so as to follow stratigraphic correlations, account for well data, and honor geologic interpretations. It accounts for geophysical information by converting the geologic model to synthetic seismic traces, accounting for fluid saturation, and comparing these traces with observed seismic trace data. The process perturbs the rock properties in the geologic model until the geologic model is consistent with geologic and geophysical data and interpretations.

This process produces 3-D geologic models of reservoirs that are optimized so as to match or conform as closely as feasible to geologic constraints on the distribution of observed lithofacies and porosity from wells in the reservoir, in the process taking into account stratigraphic correlations. The geologic models produced with the present invention match or also conform as closely as feasible to geophysical constraints present in seismic survey data obtained from the reservoir. This is done by calculating acoustic velocity and bulk density from the modeled lithofacies and porosity values. These values are used to calculate synthetic seismic traces to show the seismic response of the geologic model.

The process of the present invention provides for merging 3-D geologic modeling with forward seismic modeling to produce geologic models that are consistent with both geologic and geophysical information obtained from the subsurface.

The process of the present invention can use several types of data for building the geologic model: core- and log-derived lithofacies, porosity, and fluid saturation data from wells; seismic data from a 2-D or 3-D seismic survey; interpreted structural and stratigraphic surfaces and geological and geophysical criteria defining the distribution and relations of rock properties in the geologic model that must be matched or honored.

The geologic model is a three-dimensional array of model blocks, which is formed by generating a tentative 3-D geologic model and by assigning lithofacies and porosity values to each model block. Synthetic seismic traces are then generated for each vertical stack of blocks in the three-dimensional array. This is done in the following sequence:

Acoustic velocity and bulk density values are generated for every block from the tentative geologic model based on the assigned lithofacies and porosity values, taking into account fluid saturation. Values for seismic impedance at each block are then obtained from the acoustic velocity and bulk density values. Reflection coefficients are then calculated at the top and base of each block.

The seismic pulse waveform is convolved with the reflection coefficients. The convolution results for all such blocks then provide a synthetic 3-D seismic survey which may be compared to the observed 2-D or 3-D seismic survey. The characteristics of the model can then be compared with the observed and desired geologic and geophysical criteria for the reservoir.

The comparison is made based on statistics that describe the distribution of rock properties within the tentative geologic model and the synthetic seismic traces relative to the geologic and geophysical criteria, including each of the following:

a) Geological criteria, e.g., lithofacies proportions, histograms of porosity by lithofacies, 3-D measures of lithofacies and porosity continuity. This match compares statistics determined from the block values for lithofacies and porosity with specified criteria.

b) Geophysical criteria, e.g., amplitudes of observed seismic traces, statistics describing shapes of seismic traces, seismic-based properties defined for intervals within each seismic trace. This match compares observed seismic properties with those calculated from the synthetic seismic traces.

An analyst may then assess the match between the statistics calculated for the tentative geologic model and the actual geological and geophysical criteria. If the match is not within specified limits, appropriate adjustments are made to the lithofacies and porosity values in the tentative geologic model, and the modeling process repeated. This can be iteratively repeated until the match is within specified limits.

If the match is within specified limits, an output record of the geologic model (i.e., block values for lithofacies, porosity, acoustic velocity, and bulk density) so formed is then available. The geologic model so formed represents a realistic version of the subsurface reservoir of interest, which can be used to evaluate the need for and location of additional wells, for example.

An object of this invention is to develop a process for building 3-D geologic models or representations of subsurface features that merges geologic modeling with forward seismic modeling.

An object of this invention is to develop a process for building 3-D geologic models that accounts for geologic data and interpretations and geophysical data and interpretations, expressed in the form of criteria.

An object of this invention is to build 3-D geologic models that consist of three-dimensional arrays of non-overlapping blocks in which rock properties (e.g., lithofacies, porosity) are assigned to the blocks.

An object of this invention is to develop a process for building 3-D geologic models which begins from a distribution of rock properties, such as lithofacies and porosity.

An object of this invention is to build 3-D geologic models by iteration on block values of lithofacies and porosity.

An object of this invention is to build 3-D geologic models by taking into account geologic constraints, geophysical constraints, or both.

An object of this invention is to build 3-D geologic models which take into account the fluid content of the modeled domain.

An object of this invention is to build 3-D geologic models by simultaneous, dependent, multivariable iteration.

An object of this invention is to build 3-D geologic models using either actual depth or relative stratigraphic coordinates.

An object of this invention is to build 3-D geologic models using multi-component objective functions.

An object of this invention is to build 3-D geologic models which reproduce tacking patterns of rock properties in the subsurface by directly integrating seismic races as well as 3-D geologic criteria.

An object of this invention is to build 3-D geologic models which account for three-dimensional information about rock properties derived from seismic survey data.

An object of this invention is to build 3-D geologic models for which synthetic seismic traces match observed seismic traces.

An object of this invention is to build 3-D geologic models which simultaneously account for the differing distributions of geologic or geophysical data in two or more zones, or in regions within zones, that comprise the modeled volume.

An object of this invention is to build geologic models using either zero-offset or non-zero offset seismic data and modeling.

The process of geologic modeling according to the present invention has several advantages over current geologic modeling approaches that sequentially model lithofacies and porosity. It simultaneously builds a geologic model of lithofacies, porosity, acoustic velocity, and bulk density. It also uses many geological and geophysical constraints to distribute rock properties in three dimensions.

This process of geologic modeling has several advantages over current implementations that are based on impedance calculations in forward seismic modeling and model-based inversion. Calculation of seismic impedance and the forward seismic modeling used in this process is based on fundamental rock properties that cause the seismic response. Lithofacies and porosity, distributed parallel to stratigraphic surfaces, are converted to acoustic velocity and bulk density, accounting for fluid saturation values, in order to generate the synthetic seismic trace. Other contributions (e.g., from the seismic-acquisition process and subsurface faults) are removed or mitigated from the observed seismic traces prior to this step.

The present invention uses geologic constraints on the three-dimensional continuity of lithofacies and porosity to account for within-trace and between-trace spatial correlations. It also reduces ambiguity in seismic inversion by simultaneously optimizing band-limited geophysical constraints within seismic bandwidth and finer vertical resolution geologic constraints on the scale of well data. It produces a 3-D geologic model in which synthetic seismic traces derived from this model match observed seismic traces.

DESCRIPTION OF PREFERRED EMBODIMENT

Glossary of Terms

Figure 1:
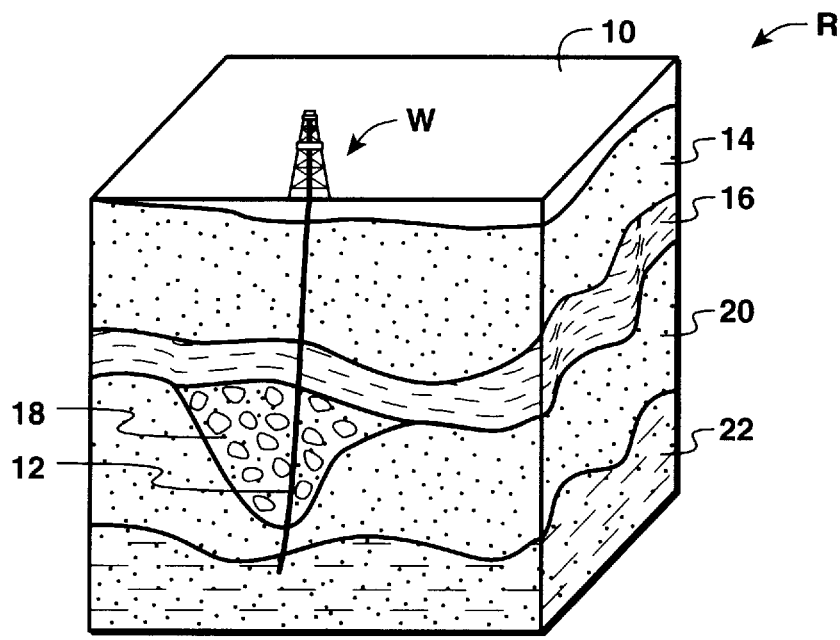
FIG. 1 is a schematic diagram of a portion of the earth's subsurface containing a reservoir of interest.

At the outset, and for ease of reference, certain terms used in this detailed description of the present invention and their meanings as used in this context are set forth.

Objective function—A mathematical function that indicates the degree of agreement or disagreement between characteristics in a tentative geologic model and the desired characteristics of an acceptable geologic model. The function typically is in the form of a linear combination of calculated values of those components that are specified for use. The values of the components combine statistics calculated from the rock properties in the model with corresponding user-specified criteria. The function commonly is defined so as to attain a value of zero for perfect agreement and a positive value for non-agreement.

Component—any one of the properties or characteristics in the set of criteria. Specifically, a component is represented by one of several terms in the objective function.

Criteria—a specified set of rules or constraints describing various geophysical or geological properties or characteristics of subsurface areas which must be achieved for processing results to be both realistic and accurate. For example, one criterion may be that the geologic model consist fifty percent of sandstone.

Forward seismic model—a synthetic seismic trace formed by convolving a seismic pulse with reflection coefficients obtained from estimated lithofacies and estimated porosity.

3-D geologic model—A representation of a portion of the earth's subsurface that is created to describe significant features, properties, and characteristics of the rocks therein. Typical models are comprised of three-dimensional arrays of non-intersecting blocks which en toto fill the entire volume of rock being modeled. Each block is assigned values that represent rock properties (e.g., lithofacies, porosity, permeability) in that respective portion of the subsurface. In order to best match geology, models and blocks should take into account structural features and stratigraphic correlations, and such correlations should be used during the assignment of rock properties to the blocks.

Tentative geologic model—A 3-D geologic model which may or may not meet desired characteristics of the final geologic model that is being created. A tentative model typically is under consideration at each step in an iterative process that perturbs the model through modification of rock properties. It is tentative in the sense that we will only retain the model if it better matches the desired characteristics of the final geologic model.

Seismic model—A numerical model (1-, 2-, or 3-D array) of acoustic velocities and bulk densities associated with blocks in a geologic model or layers in the subsurface; normally used for the calculation of synthetic seismic traces by any of several methods in one, two, or three dimensions.

Seismic data—Information collected by creating seismic waves with sources of seismic energy and observing the arrival times and amplitudes of the waves reflected from interfaces with contrasting acoustic velocity and/or bulk density or refracted through high-velocity intervals. These data are processed using procedures such as filtering, removing of multiples, muting, stacking, and migration.

Observed seismic trace—The recorded seismic-reflection record of the response of seismic energy after passing through, and being reflected by, rocks in the subsurface. The recorded response typically has been processed according to standard geophysical methods. Its usual form is a series of pairs of observed values, (T, AMP), where T represents seismic travel-time, and AMP represents the positive or negative amplitude of the waveform at that travel-time.

Synthetic seismic trace—An artificial seismic-reflection record which is generated numerically from observed or hypothetical rock-property data and an assumed seismic pulse. The record may be generated by any of several forward seismic modeling processes. As with the observed seismic trace, the synthetic seismic trace is comprised of pairs of travel-times and amplitudes.

Lithofacies—the physical and organic properties and internal characteristics of formation or rock layers.

Porosity—the relative volume of pore space in a formation or rock.

Observed lithofacies—lithofacies values obtained directly or indirectly from actual well data.

Observed porosity—porosity values obtained directly or indirectly from actual well data.

Estimated lithofacies—lithofacies values assigned to blocks at the outset of, or calculated during, the iterative processing steps described below.

Estimated porosity—porosity values assigned to blocks at the outset of, or calculated during, the iterative processing steps described below.

DETAILED DESCRIPTION

In the drawings, FIG. 1 illustrates schematically a subsurface reservoir R in an area of interest beneath a surface 10 which may be the earth's surface or the surface of the sea. The reservoir R usually has been penetrated by one or more wells W, such as along a borehole 12, in one or several earth formations, such as those indicated as successively deeper layers 14, 16, 18, 20 and 22. After initial wells have indicated that the earth in the vicinity of reservoir R is of interest, it is necessary to evaluate the reservoir as to its rock properties and internal characteristics. It is desirable to obtain a representation of the reservoir R which is as accurate a representation of actual subsurface rock characteristics as possible. Decisions as to where and whether to drill additional wells can then be made on information which is as complete and realistic as possible.

The representation or image of the reservoir R at the outset at best is an initial surmise or estimate of actual earth reservoir features. To the extent that there are existing wells in the area, geologic data, typically in the form of lithofacies and porosity measures, are obtainable. These can be had from various actual measurements obtained by well logging instruments in the borehole 12 or from core samples taken in the formations adjacent to the borehole 12. From these measurements, either directly or indirectly, various geological parameters of interest about the formation in the vicinity of the borehole 12 are obtained.

Examples of such parameters of particular interest are the lithofacies and porosity of the actual reservoir rock materials. Lithofacies at a particular reservoir location is an actual record of the rock in a particular sedimentary environment; it normally includes both physical and organic characters of the rock. These include the type of rock, its mineral content, its sedimentary structure, bedding characteristics, fossil content, and the like. Porosity of a reservoir rock is a measure of the relative presence of pores or openings present per unit volume in the formation rock; typically these are filled with fluid of some sort.

Figure 2:
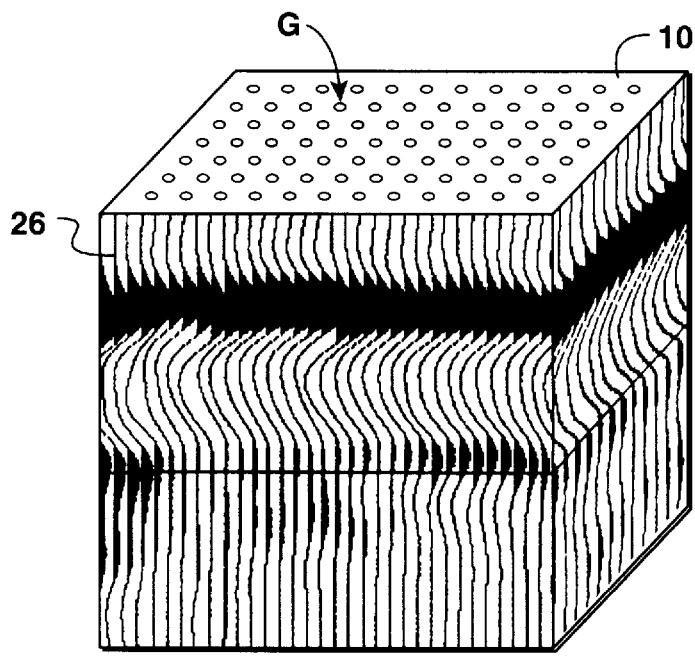
FIG. 2 is a schematic diagram of a three-dimensional array of seismic survey data obtained in the same area of the earth's subsurface as FIG. 1.

In FIG. 2 of the drawings, results of a three-dimensional seismic survey in the same area beneath the surface 10 are displayed schematically. The seismic survey data are records of the response of the subsurface formations in the area to the travel of acoustic energy. The energy is emitted from sources and sensed at receivers arranged over the surface 10 during one or more seismic surveys. Recordings or traces 26 of this energy are obtained for a plurality of locations over grid array G across the surface 10. As such, the traces 26 indicated are data samples indicative of the response to seismic energy of the three-dimensional earth volume beneath the surface 10, including areas which are not penetrated by, or near to, the well W shown in FIG. 1 or other wells. However, as has been noted, existing seismic surveying techniques do not provide the ability to measure formation nature or content, including characteristics such as lithofacies and porosity, directly.

Another important type of information used by this process is interpretive information derived from analysis of the well and seismic-survey data, as well as geological concepts. This information, for example, may be in the form of variograms, histograms of lithofacies and porosity, maps of lithofacies percentages or average porosity, seismic attributes, and seismically derived lithofacies percentages and average porosity. Such data comprise the geologic and geophysical criteria used by this process.

According to the present invention, the geologic data obtained from wells such as W in FIG. 1, seismic survey data of the type illustrated in FIG. 2, and interpretive information are processed. The processing according to the present invention is preferably performed using a digital computer of suitable computational capacity in terms of both speed and data volume. The result is a representation or geologic model M (FIG. 4) which more closely and accurately depicts the actual subsurface characteristics of the reservoir R based on the physical measurements and interpretations, both geologic and seismic, available from it. The results obtained are thus also consistent with actual physical measurements and interpretive information.

Figure 3:
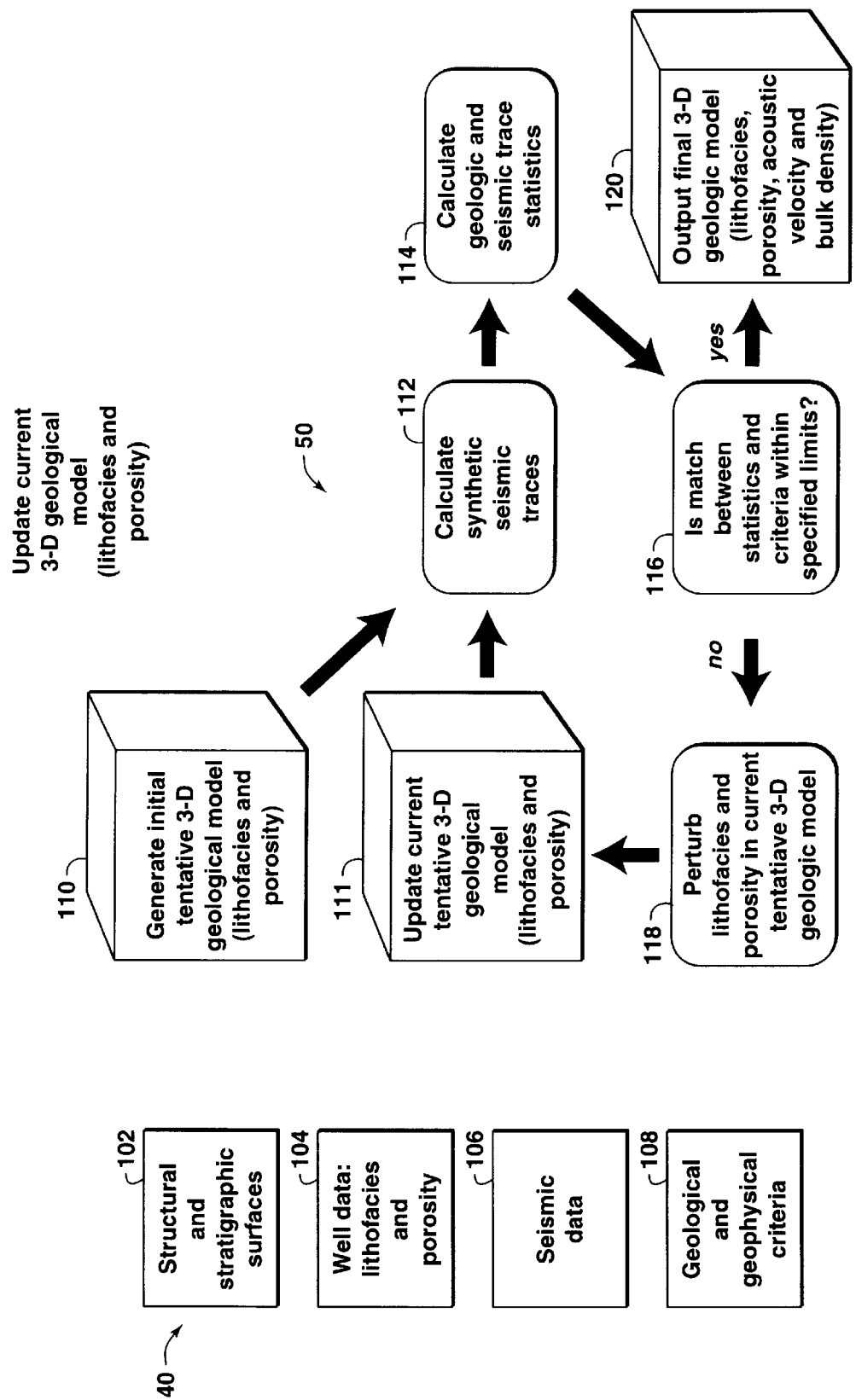
FIG. 3 is a brief schematic diagram of the processing sequence for geologic and geophysical data according to the present invention.
Figure 4:
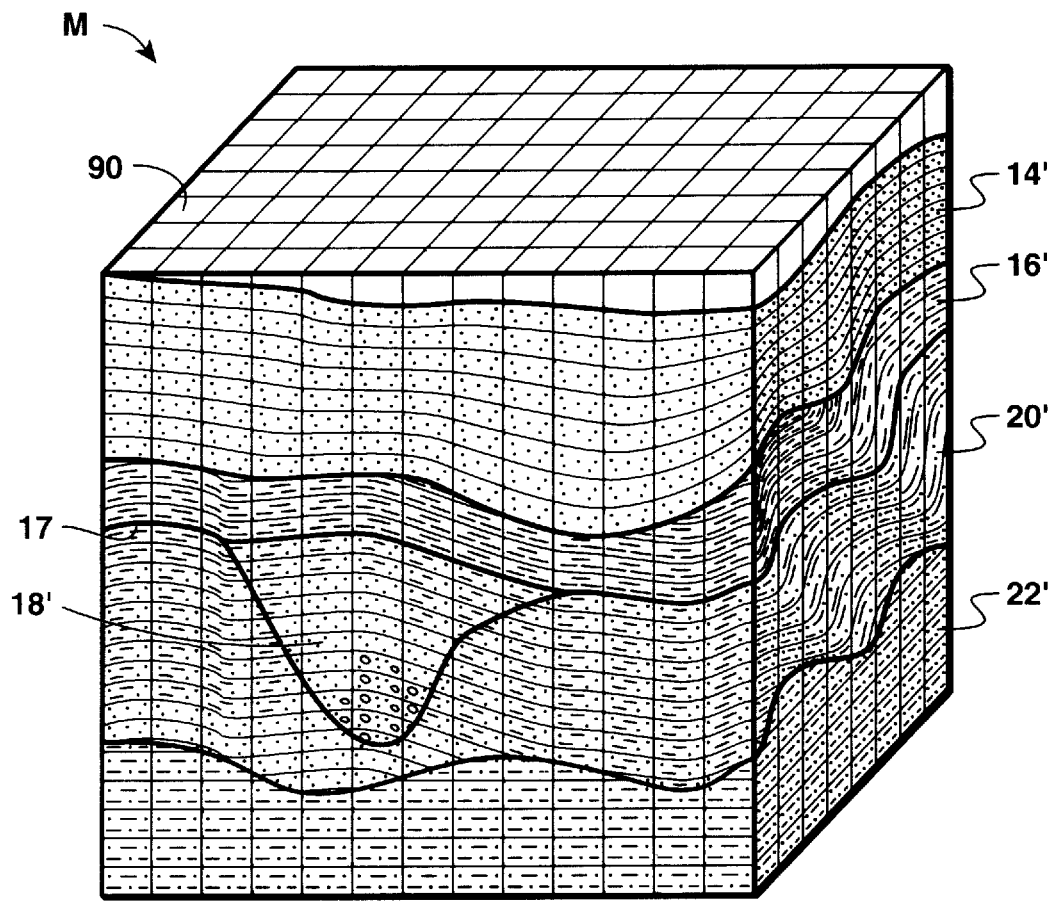
FIG. 4 is a schematic diagram of a representation of the reservoir of interest in FIG. 1 obtained by the process of FIG. 3 of the present invention.

The representation or geologic model M of FIG. 4 is obtained by a process including an initial data input procedure, indicated schematically at 40 in FIG. 3 and an iterative optimization process 50, also shown in FIG. 3. Further features of the data input 40 and optimization process 50 of FIG. 3 are set forth in FIGS. 5A and 5B.

The process of the present invention builds three-dimensional geologic models M of the subsurface that primarily represent petroleum reservoirs and/or aquifers, but also can be used for other geologic applications. This process produces three-dimensional geologic models M that are optimized so as to match (a) two-dimensional and three-dimensional geologic constraints on the distribution of lithofacies and porosity, taking into account stratigraphic correlations, and (b) geophysical constraints in the form of observed seismic traces by calculating acoustic velocity and bulk density from lithofacies and porosity and calculating the seismic response to the geologic model.

This process for merging three-dimensional geologic modeling with forward seismic modeling produces geologic models that are consistent with geologic and geophysical information that describe the subsurface. The initial procedure shown in FIG. 3 summarizes information used in application of this invention and the modeling process.

This process can use several types of data for building the geologic model:

1. interpreted structural and stratigraphic surfaces obtained from seismic data, as indicated at step 102;

2. core- and log-derived lithofacies and porosity data, during step 104, obtained from wells such as W;

3. seismic data, like that of FIG. 2, from a two-dimensional or three-dimensional seismic survey as indicated at step 106; and 4. geological and geophysical criteria defining the distribution and relations of rock properties in the geologic model that must be matched as indicated at step 108.

The geologic model M to be formed is initially comprised of an assigned or specified number of individual model blocks 90 (FIG. 4) in a three-dimensional array. The lateral or horizontal two dimensions of the array represent geographic coordinates along the surface 10 (FIG. 1) and the vertical dimension represents depth beneath the surface 10.

The iterative optimization process 50 (FIG. 3) of the present invention builds a geologic model and is performed in the following sequence of steps:

1. Generate a tentative three-dimensional geologic model by assigning estimated and observed lithofacies and porosity values to each model block during a step 110;

2. Calculate synthetic seismic traces for each vertical stack of blocks in step 112, according to the following sequence:

a) Generate acoustic velocity and bulk density from the lithofacies and porosity at each block in the tentative geologic model, taking into account its fluid saturation;

b) Calculate seismic impedance for each block 90;

c) Calculate the reflection coefficients at the top and base of each block 90; and d) Convolve a seismic pulse of suitable form with the reflection coefficients so obtained.

3. Calculate during step 114 statistics that describe the distribution of rock properties within the tentative geologic model and the synthetic seismic traces relative to the following geological and geophysical criteria:

a) Geological criteria, e.g., lithofacies percentages, histograms of porosity by lithofacies, three-dimensional measures of lithofacies and porosity continuity. These statistics are determined from the block values of lithofacies and porosity.

b) Geophysical criteria, e.g., amplitudes of observed seismic traces, statistics describing shapes of seismic traces, seismic-based properties defined for intervals within each seismic trace.

4. Assess during a decision or comparison step 116 the match between the statistics calculated for the tentative model and the geological and geophysical criteria and observed and synthetic seismic traces:

If the match is not within specified limits:

a) Perturb lithofacies and porosity values in the tentative geologic model, as indicated at 118 and update the geologic model 111; and b) Repeat steps 112, 114 and 116.

If the match is within specified limits, output during step 120 a representation or image of the geologic model (i.e. block values for lithofacies, porosity, acoustic velocity, and bulk density) to a file or data display or both.

Figure 5A:
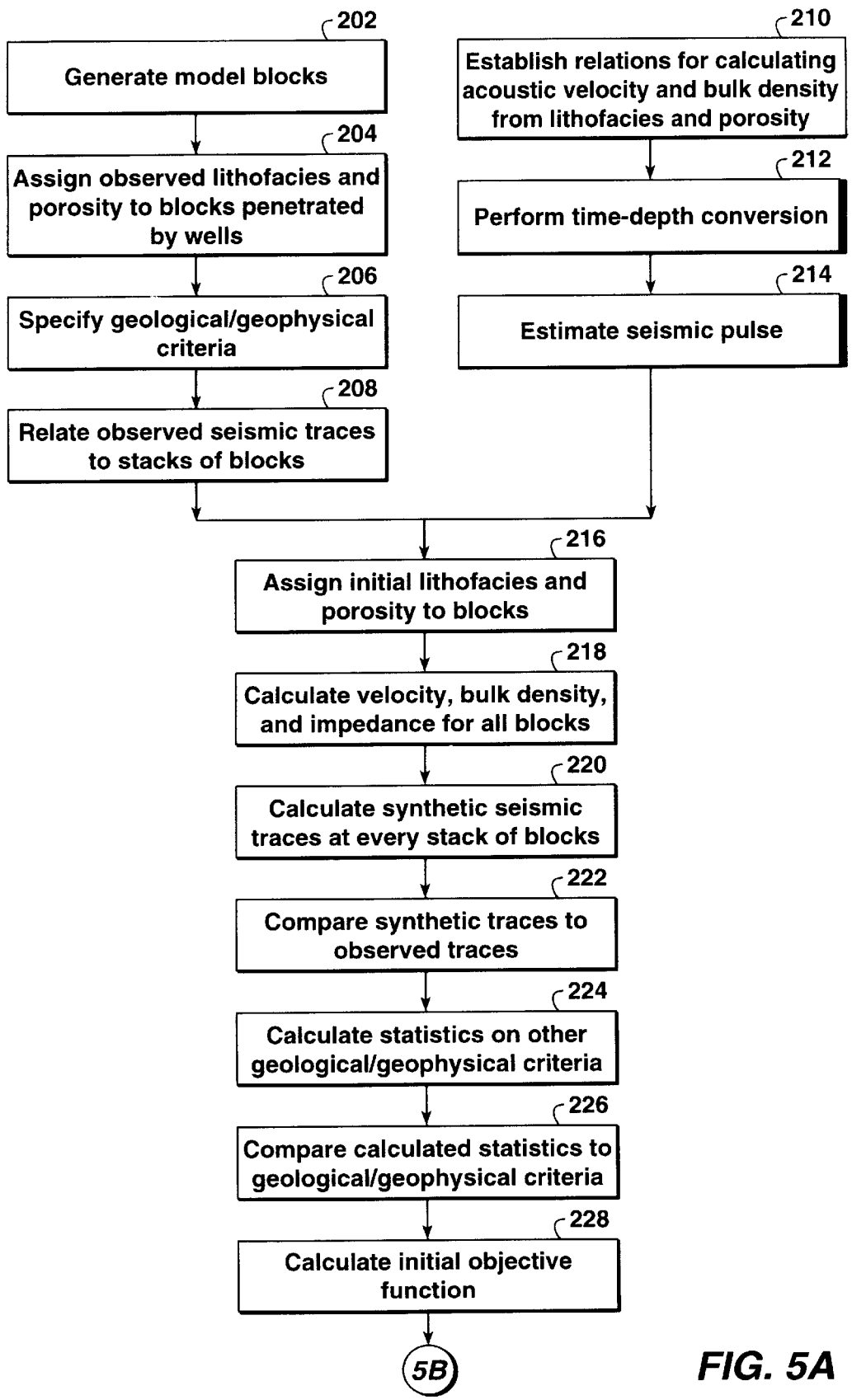
FIGS. 5A and 5B are a more detailed illustration of the process of FIG. 3.
Figure 5B:
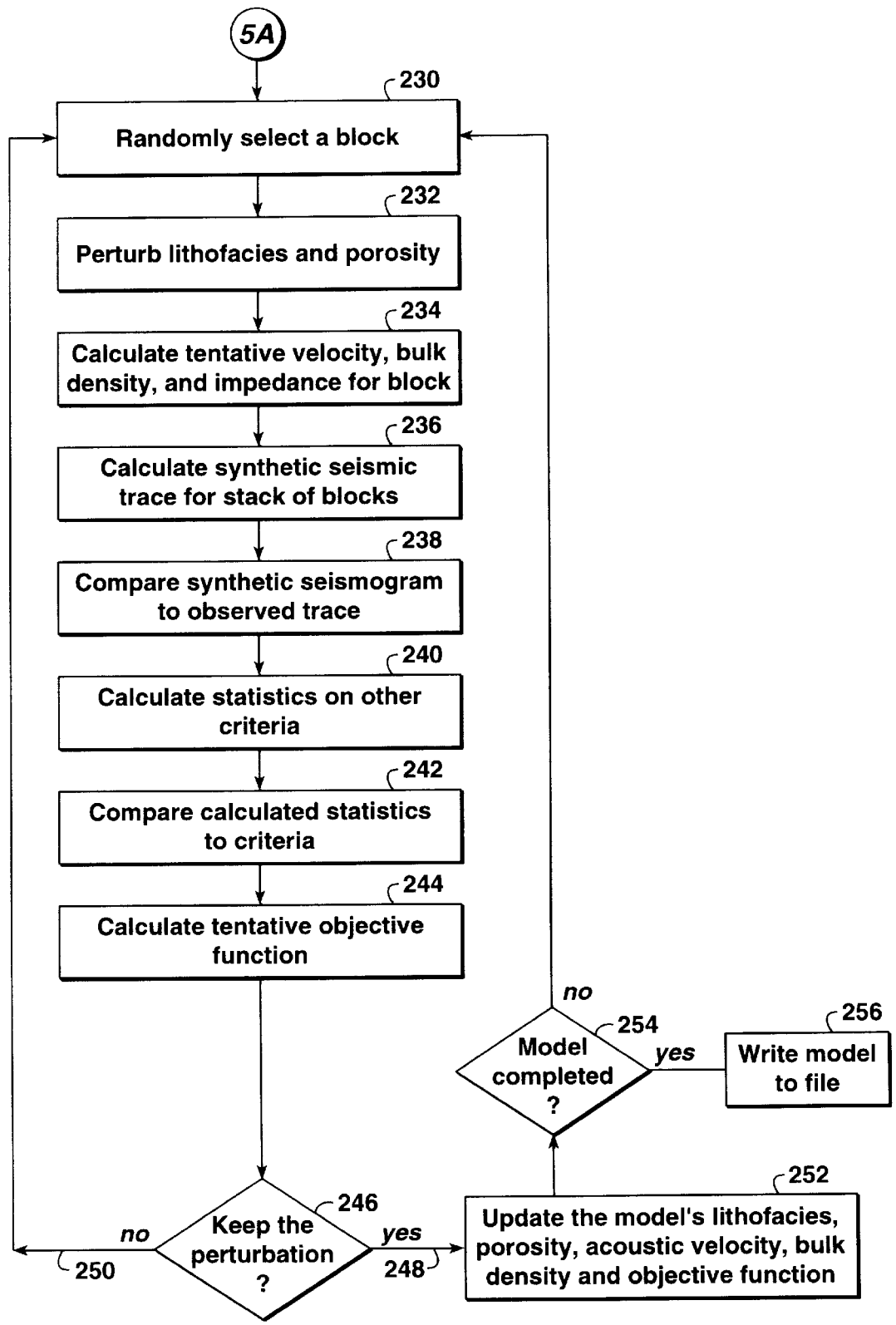

FIGS. 5A and 5B show in more detail how the process steps of FIG. 3 are performed according to the present invention, which will typically be implemented on a digital computer.

Data Preparation and Initialization

1. An initial step 202 of the process is to form an array of blocks 90 in three dimensions that comprise the geologic model M. Blocks may be defined as having constant dimensions one to another (typically, rectangular in plan view and of constant thickness), or they may vary one from another in size and shape. Typical blocks are made one foot to one meter thick, and twenty to one-hundred meters laterally. It is only necessary that the non-overlapping blocks jointly describe the total volume of rock being modeled. The complete set of blocks should represent all portions of the subsurface to be modeled, taking into account structural and stratigraphic features and correlations. At this stage, each block 90 has been assigned a position and volume in the subsurface, but has not been assigned rock properties (i.e., lithofacies codes or porosity values). As is discussed further below, the preference that structural and stratigraphic features are taken into account leads to a preference to use a correlative coordinate system, which is sometimes also referred to as relative-Z coordinates.

2. Next is step 204, performed to assign lithofacies and porosity observed in wells such as W to the blocks 90. Observed lithofacies and porosity values obtained from wells should be honored in the final geologic model. A preferred mode of operation is to assign lithofacies and porosity values directly to those blocks 90 intersected by wells W. This assignment step involves both (a) determining which blocks are intersected by the boreholes 12 of the wells, and (b) placing the values observed at each intersected borehole segment into the corresponding blocks. These assigned values are left unchanged during model block property value modification or perturbation, to be discussed below.

3. A user of the process is then required in step 206 to specify geological and geophysical criteria or rules for modeling. This invention primarily is focused on building a geological model such that synthetic seismic traces generated from the model match observed seismic traces. However, seismic-trace criteria alone are rarely adequate to generate a reasonable geologic model. For this reason, the geologic modeling process should include several additional geological and geophysical criteria that the geologic model must meet. Typical examples of non-trace criteria include measures of 3-D spatial continuity (e.g., variograms) of lithofacies and porosity, maps of net/gross ratio, frequency distributions of lithofacies and porosity, and calibration-derived seismically based properties computed over seismic-time intervals. Such criteria are referred to hereafter as components.

The various components may each be defined in mathematical terms, allowing comparison of desired values with those calculated from a potential model. Combining components into a mathematical objective function summarizes the overall match between the geologic model and the desired criteria or rules. This allows integration of numerous types of information and relationships into the model.

Table 1 below lists criteria that have been found useful for geologic modeling, although other components may be equally useful.

Table 1. Useful Objective-Function Components
Geological components
   Lithofacies
   Two-point variogram (two-lithofacies indicator)
   Two-point histogram (N lithofacies)
   Multipoint covariance (two-lithofacies indicator)
   Multipoint histogram (N lithofacies)
   Lithofacies fractions or percentages
   Net/gross ratio
   Maps of lithofacies fraction or percentage
   Map of net/gross ratio
   Vertical profiles of lithofacies fractions or percentages
Porosity (calculations optionally by lithofacies or for entire geologic model)
   Histograms
   Maps of average porosity
   Vertical profiles of average porosity
   Two-point porosity variogram
   Two-point porosity-indicator variogram
Geophysical components
   Lithofacies percentages or probabilities for intervals within seismic traces
   Average porosity for intervals within seismic traces
   Seismic traces (amplitude)
   Seismic attributes
   Map of interval velocity In step 206, the user specifies values that such criteria are desired to attain in the final model. A typical example of a lithofacies-based criterion is the percentage of each lithofacies type (e.g., 35% sandstone, 65% shale) to be found in the final model. An example of a porosity-based criterion is the histogram of porosity in sandstone that is desired in the model. An example of a geophysical criterion is the set of observed seismic traces that are to be matched. The criteria may be specified in many ways, including numbers, variogram models, frequency distributions, and gridded maps, among others. It is also convenient to calculate such information from separately created 2-D arrays or 3-D models.

Non-trace components are important even beyond the capability to integrate various features. It is well known by seismic modelers that very thin beds will have only small effects on the form of generated synthetic seismic traces, and that these contribute to the non-uniqueness of seismic inversions. Observed seismic traces and synthetic seismic traces coarsely estimate the vertical variation and values of lithofacies and porosity, but do not provide information on the fine vertical scale typically required of 3-D geologic models; one cannot expect seismic models alone to provide a distribution of lithofacies and porosity at a finer resolution than is provided by the seismic traces. Accordingly, along with seismic traces, a preferred method of performance of the present invention requires use of additional objective-function components to constrain the stacking of lithofacies and porosity. For instance, vertical variograms of lithofacies and porosity obtained from vertically detailed well data constrain fine details within the coarser trace resolution.

In addition, traces are closely spaced laterally, but each synthetic seismic trace is calculated independently and therefore carries no direct information regarding lateral continuity. Lateral variograms of lithofacies and porosity are useful components for controlling lateral continuity. Other useful components in the objective function include lithofacies fractions (global or mapped), porosity histograms (by lithofacies), mapped average porosity (globally or by lithofacies), and vertical trends in lithofacies and porosity.

An important consideration in defining these criteria is to take into account stratigraphic correlations. Lateral variograms, for example, should be calculated to measure continuity parallel to stratigraphic surfaces, not just at a horizontal depth. If structural dip and stratigraphic correlations are not considered, a variogram calculated horizontally will cross strata and represent non-correlative rocks. This concept is discussed further below regarding perturbation of the model block parameter values.

Seismic traces are a key element in building the geologic model, and themselves constitute a criterion of the objective function. The observed seismic traces are associated with corresponding stacks of blocks 90 during step 208. When seismic traces are selected, a preferred method is that only one trace be placed into a stack of blocks. If blocks are large relative to the spacing between traces, then a subset of the traces should be used. The traces nearest the block centers typically are used, but various selection criteria may be applied. On the other hand, if no suitable-quality traces exist for a given stack of blocks, that stack need not have a trace assigned, and no synthetic seismic traces need to be calculated for that stack. Lateral variograms and other components in the objective function will carry information into those blocks. For this reason, traces from 2-D seismic surveys may also be used with this invention.

4. Step 210 is performed to establish relations so that lithofacies and porosity can be used to estimate acoustic velocity and bulk density. A single, lithofacies-independent relation may be used, or separate calibrations may be defined for each lithofacies; for most cases, a preferred method is to use a separate calibration for each lithofacies. A simple method for defining these relations is to establish straight-line interpolators, such as is commonly done with log curves in the field of petrophysics. Such interpolators relate acoustic velocity of the rock and fluid to porosity (e.g. Wyllie's equation), and relate rock and fluid density to porosity. Other similar calibrations also may be used. Interpolation of bulk density and acoustic velocity for a given value of porosity is then a simple matter.

An alternative method of defining these relations is to use bivariate probability distributions, say between bulk density and porosity. Here one may use a cross plot, or a correlation coefficient and an assumed bivariate normal distribution, to represent the relations between porosity and density. Similar bivariate relations could be used between porosity and velocity. For a given lithofacies and value of porosity, values of density and velocity may be obtained by randomly sampling from the appropriate bivariate distributions.

Seismic surveys are conducted over rocks that contain various fluids in differing amounts (i.e., water, oil, and gas) that affect the seismic response. When calculating acoustic velocity and bulk density for a block, lithofacies and porosity alone may not be adequate because fluid content can significantly affect bulk density and acoustic velocity. It is thus necessary to take into account water, oil, and gas saturations. The calculated saturation for a given block is then used with porosity and other information to determine the proper values of acoustic velocity and bulk density for calculating synthetic seismic traces.

5. During step 212, time-depth conversion is performed on the interpreted seismic surfaces using standard methods that are known to those skilled in the art. Any location along an interpreted seismic surface is known in seismic time, and the time-depth conversion allows a depth to be associated with every such location. This knowledge of the time-depth relationships along the gridded surfaces allows us to calculate seismic time corresponding to the depth of any block in the geologic model.

6. Next, it is necessary to estimate or determine the seismic pulse that is appropriate for this seismic survey during step 214. This process uses the normal procedures known to those skilled in the art of seismic modeling. The pulse may be zero-phase or any transform thereof, such as minimum phase or an integrated pulse.

It is to be noted that steps 210, 212, and 214 may be executed in any order relative to steps 202–208. It is common that steps 210, 212, and 214 may be executed first, or that steps 202–208 be done in parallel to them.

7. An initial model is prepared during step 216 by assigning estimated lithofacies and estimated porosity to those blocks not containing well data. Step 216 fills the blocks 90 with lithofacies codes and porosity values, and may be done in any convenient, even arbitrary, way; a random process is typically used. It is not necessary that the assigned lithofacies and porosities meet any of the geological and geophysical constraints that will control the modeling process in the following steps. A preferred method is to sample from a desired fraction-distribution of lithofacies, and to sample from porosity distributions representing the lithofacies.

Another method of initializing the model is to load a previously generated model into the blocks. This is convenient if it is desired to change components, weights, or desired criteria part way through the model-building process.

8. Steps 218 and 220 are then performed to calculate a synthetic seismic trace at every vertical stack of blocks 90 in the model. Given the initial lithofacies and porosity values for every block 90 in the model and the calibrations developed in step 210, one can generate two new properties: acoustic velocity and bulk density. The product of acoustic velocity and bulk density in a block 90 defines acoustic impedance for that block. From these impedances, one may use well-known procedures to calculate reflection coefficients at the top and base of each block 90.

The seismic-modeling step 218, 220 typically is done in terms of seismic time, rather than in depth, so times associated with the blocks are required. The seismic times to the top and base of each block 90 may be calculated by first defining a reference datum (say, surface 10 or at the top of the model) for which both time and depth are known, and then moving vertically through the model and using acoustic velocities assigned to each block to calculate the seismic times at the block boundaries.

Using the impedance and other information, the next step computes a synthetic seismic trace for each vertical stack of blocks in the geologic model by convolving the seismic pulse with the calculated reflection coefficients, as indicated at 220. This process is known to practitioners of seismic modeling.

Calculation of synthetic seismic traces is subject to seismic edge effects. A seismic signal at any location depends not only on that location's rock properties and fluid content, but also on such properties above and below it. For example, in the case of a zero-phase pulse, this dependence extends at least one-half of the length of the seismic pulse above and below the location of interest. The synthetic trace-generation process thus must account for such effects at the model's top and base. Several methods are available to correct for edge effects caused by non-existence of impedances above and below the modeled interval.

The simplest method forms a limited number of thick, model-wide layers with assigned acoustic velocity and bulk density at the top and base of the model. A more comprehensive method defines the 3-D model as containing added blocks at the top and base of the model. This second method is preferred unless computational time is considered to be significant.

9. Step 222 is then performed to calculate statistics to measure the degree of agreement of the synthetic seismic traces with the observed seismic traces. Each observed trace consists of a series of time-amplitude pairs, (t, AMPobs). For each time, the synthetic trace also provides an amplitude value, AMPsyn. Step 222 compares the synthetic seismic traces to the observed seismic traces to measure their degree of agreement. This may be done by, for example, calculating the root-mean-square (RMS) difference (or simply sum-of-squares of differences, SSD) between AMPobs and AMPsyn for all pairs in a trace and over all traces, as follows:

$$SSD = \Sigma_S \Sigma_t (AMPobs - AMPsyn)^2$$

$$RMS = (SSD/n)^{1/2}$$

where $\Sigma_S$ represents the sum over all vertical stacks of blocks for which an observed seismic trace occurs, $\Sigma_t$ represents the sum over all time points in the seismic trace for a given stack of blocks, and n indicates the number of pairs in the sums of SSD; best agreement is implied by RMS or SSD values near zero.

RMS is affected by the choice of origin and scale in the variable of interest. If RMS or a similar statistic is used to compare the synthetic trace with the observed seismic trace, the calculated measure of similarity will depend not just on the degree of match, but also on the amplitude gains (that is, relative amplitude scales) of the two sets of traces. To make a valid comparison of traces, these gains should be identical for both. Standard deviation of amplitude is a convenient measure of gain for this purpose. To ensure that the gains are equal, the standard deviation of amplitude in the synthetic seismic traces can be forced to match the standard deviation of the observed seismic data.

An alternative measure is the correlation coefficient between AMPobs and AMPsyn, calculated over all pairs of points in the traces; best agreement is implied if the correlation coefficient, r, is near 1. In order to match other components (c.f. step 224, below) which attain optimum values at zero, an appropriate statistic is $1 - r^2$. The correlation coefficient is independent of origin and scale, so gain is not a concern.

10. It is necessary then to calculate statistics to measure the degree of agreement of non-trace criteria (Steps 224 and 226). Criteria that do not involve seismic traces were discussed in step 206 above and are included above in Table 1. Such components normally must be employed to constrain the model sufficiently to produce a reasonable geologic model. In addition, they provide controls for blocks at a vertical resolution finer than that provided by the seismic traces, as well as provide controls on lateral and vertical continuity of rock properties. Use of such components allows integration of various types of information and relationships into the geologic model M.

A preferred mode of operation when calculating statistics for these criteria is to take into account stratigraphic correlations between blocks in the model. For instance, if a bed is dipping, one should not calculate a variogram horizontally from one block to adjacent blocks, but instead determine the degree and direction of dip and select those blocks that correlate stratigraphically to the block in question. This process should be followed when calculating all such criteria. Computation can be reduced if the vertical positions of the blocks are defined (step 202) according to correlative coordinates (also called relative-Z coordinates); if so, the blocks are stored in arrays representing correlative layers, and all blocks in such a layer are correlative. Determination of correlative layers, either during calculations or for creating relative-Z coordinates, is based on computer grids that define stratigraphic correlations.

The modeling process (c.f., step 206) requires that training information corresponding to the desired components or criteria be provided by the user. In this step, component statistics are calculated from the properties in the initial model during step 224 and then compared to the desired values in step 226. For example, consider percentage of each lithofacies in the model as a criterion; a typical comparison statistic for this component might be the sum of squares of the differences between the model-wide lithofacies percentages (PCTcal) in the current geologic model and the desired percentage (PCTdes), as $$COM1 = \Sigma_1 (PCTcal - PCTdes)^2$$

where COM1 represents this first component selected for building the geologic model, and $\Sigma_1$ is the sum over all modeled lithofacies.

A second example considers the two-point variogram. Here a typical comparison statistic is the sum of squares of the differences between the model-wide variograms ($\gamma$cal) calculated from the current geologic model and the desired variogram values ($\gamma$des), as $$COM2 = \Sigma_h (\gamma cal - \gamma des)^2$$

where COM2 represents this second component selected for building the geologic model, and $\Sigma_h$ is the sum over all variogram distance and direction vectors.

As a third example, consider porosity histograms; here one might use $$COM3 = \Sigma_1 \Sigma_c (PORcal - PORdes)^2$$

where PORcal represents the calculated fraction of porosities from the current geologic model in a class of the porosity histogram, PORdes represents the desired fraction in the histogram class, $\Sigma_1$ represents the sum over all lithofacies, and $\Sigma_c$ represents the sum over the histogram classes.

The seismic-traces component is used in the same way as the others; if RMS is used, then the seismic-traces component may be designated, for instance, as COM4 RMS.

11. Step 228 is then performed to compute an objective function. The specified components are combined into a multivariate objective function, typically through a linear combination of the individual components:

OBJ=$\Sigma W_i$COMi where $W_i$ represents a weight assigned to the i-th component, COMi, and the sum is over all components being used for building the geologic model. A preferred method of defining components of the objective function is to make them non-negative and to force them to reach an optimum value (perfect agreement) at zero. If this is done for all components, the objective function will have similar properties.

A preferred method of defining weights $W_i$ associated with each component is to let $W_i = V_i U_i$ where $V_i$ represents a weight that takes into account the variability of the component (e.g., inverse of the variance due to changing lithofacies or porosity values) and $U_i$ is a user-defined, relative weight for the component. Some criteria are known with greater certainty or have greater importance than others, and the weighting factors allow us to take that into account. It is convenient to rescale the weights $W_i$ so that OBJ=1.0 for the initial model.

Optimization Process

The process in this invention requires perturbing the model's rock properties until a better match is made to the desired criteria, that is, until the objective function attains an optimum value. Any of several optimization processes can be used to make a series of perturbations provide a better fit of the model. The required characteristics of the optimization process are that properties of the individual blocks can be modified, an objective function can be defined to indicate degree of agreement, and perturbations can be accepted or rejected.

One embodiment of this invention is to use simulated annealing because of its ability to avoid entrapment in local minima in the objective-function space. We also find that the maximum a posteriori method is effective as another embodiment because it requires fewer trials to find improvements in the objective function. Other potential optimization procedures include genetic algorithms, as well as combinations of algorithms. The description here of the optimization method is in terms of simulated annealing because it is well known and easily understood.

12. The perturbation process is performed by randomly selecting a block 90 as indicated by step 230 and tentatively changing its lithofacies and porosity as indicated at step 232. Blocks in which lithofacies and porosity values were assigned directly during step 204 are not candidates for selection; these observed values are to be left unchanged. For the selected block, a preferred method for perturbation is randomly picking a lithofacies according to the desired proportions of each lithofacies in the model, and randomly picking a porosity from the distribution of porosities corresponding to that lithofacies.

13. A tentative synthetic seismic trace for the vertical stack of blocks containing the perturbed block is then calculated during steps 234 and 236. To do this, use is made of the perturbed values of lithofacies and porosity for this block with the previously developed calibrations. This is done to generate, during step 234, new, tentative values of acoustic velocity, bulk density, and subsequently acoustic impedance; then reflection coefficients at the top and base of the block in question are calculated.

When the model is initialized, the depths and corresponding seismic times to the tops and bases of all the blocks are known. As the model is perturbed and block lithofacies and porosities change, however, the acoustic velocities associated with each block also change. This has the effect of changing the time-depth relation of that block; if velocity changes slightly, the block's thickness in seismic time also changes. The seismic-modeling process may deal with this in two possible ways: (a) ignore the thickness variation and keep the block dimensions (and time-depth relation) constant, or (b) as each block is perturbed and modified, recalculate the position in time of that block's base and those of all deeper blocks.

Step 236 is performed to compute a synthetic seismic trace for the vertical stack of blocks that contains the perturbed block. A preferred method of executing this step differs from step 220, in that synthetic seismic traces should not be calculated for the entire model. Only a single stack of blocks is affected by perturbing the values in one block, so it is adequate to merely calculate that single synthetic seismic trace.

14. During step 238, the degree of agreement of the tentative synthetic seismic trace with the observed seismic trace is calculated. The statistic (e.g., RMS) used to compare all synthetic traces with the observed traces in step 222 is also computed here to determine if the tentative change in the perturbed block leads to a better match with the observed traces. Because only a single synthetic was calculated, computation of the tentative component, COMTi, is simplified. If $S = \Sigma_t (AMPobs - AMPsyn)^2$ is computed for the given vertical stack of blocks, the tentative component may be calculated by COMTi=$\Sigma_{s*} \Sigma_t (AMPobs - AMPsyn)^2 + S$ where $\Sigma_{s*}$ represents the sum over all vertical stacks of blocks, except that stack containing the perturbed block.

15. The process next continues by calculating statistics to measure the degree of agreement of non-trace criteria. As in step 224, the other geological and geophysical modeling statistics are calculated as shown at step 240 and tentative components of the objective function are compared during step 242. As with step 238, these other criteria should be defined in such a way that the statistics need not be recomputed over the entire model, but only over the portion affected by the perturbed block. In general, a preferred basis for selecting component statistics is that they can be updated locally without need to recompute them over the entire geologic model M.

16. The next process step, 244, calculates a tentative objective function. To do this, the tentative component statistics for the seismic traces and the other components are combined into a tentative objective function, OBJtent= $\Sigma W_i$COMTi, where again the sum is over all components, and the COMTi represent the tentative values of the components associated with this perturbation. OBJtent measures the degree of agreement between properties in the tentative model and the desired properties.

17. Next in the process is decision step 246, whether to retain or reject the perturbation. The decision made as to whether the tentative values in the block are to be retained or not depends on the value of the newly calculated objective function. If the tentative objective OBJtent is nearer the optimum than the current objective function OBJ (that is, OBJtent<OBJ) as indicated at 248, then the tentative perturbation is retained. In this case, the tentative values of lithofacies, porosity, bulk density, and acoustic velocity are stored in the model, and the objective function and components are changed to the tentative values as indicated at 252.

On the other hand, if the objective function has increased as indicated at 250, the values in the block and the objective-function components will be left unchanged and processing returns to step 230. However, simulated annealing allows retaining the tentative change with a small probability regardless of the objective function's increase. This is designed to prevent convergence from being trapped in a local minimum in the objective-function space. Other optimizing methods may not allow increases in the objective function.

18. After completion of step 252, step 254 is performed to determine if the model is adequate or complete. If not, control transfers to step 230 to repeat the simultaneous, dependent, multivariable iteration by sequentially perturbing blocks according to steps 230 through 244 described above. The decision to stop perturbing is made if a preassigned number of perturbations has been attempted or if preassigned criteria (e.g., minimum acceptable value) on the objective function have been attained.

19. On satisfactory completion of step 254, the generated model is provided as an output to a file during step 256. The optimized model of lithofacies, porosity, acoustic velocity, and bulk density is now available for analysis, validation, and for geological, geophysical, or engineering applications with other software. Typical uses include generating displays (e.g., cross sections of lithofacies or porosity) from the model, making geologic calculations, calculating other geological or petrophysical variables (e.g., permeability), or as input to reservoir simulation programs.

Another embodiment of the invention is useful for modeling two or more regions or geological zones of differing geology. It is rare that one set of geologic and geophysical criteria will be appropriate for describing the distribution of lithofacies and porosity for all portions of a reservoir. For instance, the reservoir may have been divided into geological zones on the basis of changes in lithofacies and/or porosity and changes in stratigraphic correlation. Even within a single geological zone, regions or groups of blocks may have different characteristic distributions of properties, depending on their particular facies or association of facies. For such cases, non-trace criteria should be specified separately for geological zones and for portions of zones.

Three-dimensional templates may be defined to delineate individual portions (laterally and vertically) of the reservoir. These may take on the form of 3-D polyhedra, but a simple concept from computer science—a masking array—is a preferred mode. The mask may be defined to be an array of codes, each element of the array corresponding to a block in the model; the code indicates which mask (that is, which geological zone or region) contains that block. Because the masks represent regions with different properties, an individual set of fitting criteria (desired values used by the objective-function components) should be used for each mask. Whenever a given block is used in calculation of a fitting statistic, the calculation should be based on the criteria associated with that block's masking variable. Each component in the objective function must then include sums over the masks. For instance, the lithofacies-percentage component would be extended to $$COM_i = \Sigma_{m\Sigma 1}(CTcal - PCTdes)^2$$

where $\Sigma_m$ represents the sum over all masks and the other terms were defined above. The total objective function is defined as previously. The synthetic seismic traces are calculated independently of masks, although the relations from lithofacies/porosity to density/velocity may vary by mask.

Examination of FIG. 4 illustrates schematically results achievable with the present invention using three geological zones. Lithofacies (sandstone, shale) and porosity values were estimated for blocks that comprised three stratigraphic intervals or zones 16', 18', 20' within the reservoir. Constant properties were assigned to bounding intervals 14' and 22' to reduce edge effects during calculation of synthetic seismic traces.

Data from well W, seismic-survey data, and geologic criteria (e.g., average net-to-gross ratio) give each interval a distinctive distribution of reservoir quality with predominantly high-porosity sandstones 18', predominantly low-porosity shales 16', and more variable reservoir-quality rocks 20'. Each stratigraphic interval has characteristic vertical and lateral dimensions for sandstones and shales that match geologic criteria in the form of variograms. The shales and sandstones are oriented parallel to the stratigraphic correlation surface 17.

The principal reservoir interval of interest 18' has a clearly defined sequence of vertically decreasing reservoir quality, from high-porosity sandstones at the base to medium-porosity shaly sandstones near the top. This vertical stacking pattern of lithofacies and porosity values is consistent with interpretive geologic information provided to the process as geologic criteria and is consistent with observed seismic traces. The principal reservoir interval 18' is bounded above by a relatively homogeneous interval containing model blocks of low-porosity shale 16' which is consistent with the observed seismic traces. Interval 20' consists of alternating beds of variable reservoir quality, with high-porosity sandstones near the base grading upward to low-porosity shales.

The embodiment of this invention described above is directed to modeling lithofacies and porosity. However, the invention is equally applicable to a situation in which any discrete and related continuous variables are modeled simultaneously, although seismic modeling may not be appropriate for certain variables. Furthermore, other embodiments of the invention exist to model a discrete variable (e.g., lithofacies) and two or more additional (continuous or discrete) variables; another example is to model lithofacies, porosity, and permeability simultaneously. If permeability is modeled, components similar to those used with porosity (e.g., continuity, histograms), plus relations between porosity and permeability, should be added; engineering components (e.g., well-test criteria) may also be used.

In addition to providing criteria for matching synthetic seismic traces, seismic data has other uses, including specification of the nature of the synthetic seismic traces that are generated. Zero-offset calculations of synthetic seismic traces is the most straightforward embodiment of this invention. However, generation of synthetic traces could be implemented using 3-D ray tracing. This would account for non-zero offsets and be applicable to such seismic data as amplitude-versus-offset (AVO) data. In this case, AVO-calculated synthetic seismic traces may have to be generated for additional stacks of blocks near the perturbed block.

Seismic attributes are used by geophysicists to describe seismic properties in a survey. These attributes are calculated from seismic traces, typically from values within time windows but also at specified seismic times. An example of such an attribute is the mean amplitude value within a portion of a trace. An objective-function component may be defined to compare an observed seismic attribute with the same attribute calculated from a corresponding synthetic trace, similarly to what is done with trace matching.

Information from a seismic survey is used for calibration of seismic properties to well data. The typical starting point is definition of intervals in a 3-D survey. These intervals may be defined on the basis of seismically correlatable sequences, inflection points (for example, see commonly owned, co-pending U. S. patent application Ser. No. 08/422, 021, "Method for Determining Formation Properties from Seismic Attributes" of C. S. Calvert, et. al.), or other criteria. Calibrations between well data and seismic attributes are then used to assign properties (e.g., average porosity) to each interval at each shot-point location. These observed, calibration-based interval properties are used during the modeling process through comparison to the current blocks' calculated values; this requires an additional component in the objective function.

The process of geologic modeling according to the present invention has several advantages over current geostatistical modeling methods that integrate seismically derived rock properties:

It directly integrates seismic data into the estimation of block properties.

This process of geologic modeling also has several advantages over current geostatistical modeling methods that integrate seismic traces:

It accounts for the effect of lithofacies, porosity, and fluid saturation on seismic response.

It models lithofacies and porosity using geologic constraints and converts these block properties to seismic impedance in order to account for geophysical constraints. These steps, followed for each perturbation, permit the application of separate geologic constraints on the distribution of lithofacies and on the distribution of porosity. This eliminates the ambiguity in continuity of seismic impedance where impedance is responding to more than one rock property.

It uses optimization techniques that have a limited dependence on the initial geologic model and that ensure reproduction of vertical and lateral variogram constraints on the spatial continuity of lithofacies and porosity.

It simultaneously models multiple zones in order to account for complex stratigraphy and seismic edge effects.

The foregoing disclosure and description of the invention are illustrative and explanatory thereof, and various changes in the data acquisition and processing sequences, the parameters selected and analyzed, as well as the processing sequences described, as well as in the details of the process of operation described above, may be made without departing from the scope of the present invention.

We claim:

1. A method of forming a geologic model of a subsurface earth reservoir of interest based on lithofacies and porosity data obtained from wells in the reservoir and seismic traces obtained from seismic survey data, said geologic model being arranged into an assigned number of model blocks in a three-dimensional array corresponding to the reservoir, comprising the steps of:

forming a tentative geologic model by assigning obtained lithofacies and porosity values to model blocks where well data are present and by assigning estimated lithofacies and porosity values to model blocks where well data are not present;

forming synthetic seismic traces based on model block values of lithofacies and porosity, taking into account fluid saturation;

forming a statistical measure indicative of the match between the synthetic seismic traces and the obtained seismic traces;

forming measures indicative of the distribution of lithofacies and porosity values within the tentative geologic model;

comparing the measures so formed with specified criteria to determine if the degree of agreement is acceptable;

retaining the current tentative geologic model if it is determined acceptable during said step of comparing;

forming a new tentative geologic model by perturbing the lithofacies and porosity values within the current tentative geologic model if said current tentative geologic model is determined unacceptable during said step of comparing; and iteratively repeating said steps of forming synthetic seismic traces, forming measures, comparing measures, and retaining or perturbing until specified limits of acceptability are achieved.

2. The method of claim 1, further including the step of:

forming an output record of the lithofacies and porosity values of the acceptable geologic model.

3. The method of claim 1, wherein said step of forming synthetic seismic traces comprises the steps of:

calculating acoustic velocity and bulk density values from the lithofacies and porosity values taking into account fluid saturation;

forming a measure of acoustic impedance for the model blocks based on the acoustic velocity and bulk density values;

determining reflection coefficients at upper and lower faces of the model blocks based on the acoustic impedance measure; and convolving a seismic pulse with the reflection coefficients for each vertical stack of model blocks.

4. The method of claim 1, wherein said specified criteria include spatial continuity of lithofacies and porosity.

5. The method of claim 1, wherein said specified criteria include vertical or lateral trends of lithofacies content and porosity values.

6. The method of claim 1, wherein said specified criteria include frequency distributions of lithofacies and porosity.

7. The method of claim 1, wherein said specified criteria include net/gross ratio.

8. The method of claim 1, wherein said specified criteria include calibration-derived seismic properties.

9. The method of claim 1, wherein the synthetic seismic traces are used to calculate seismic attributes for comparison to said specified criteria.

10. The method of claim 1, wherein said step of forming synthetic seismic traces is performed by a programmed digital computer.

11. The method of claim 1, wherein said geologic model includes multiple zones.

12. The method of claim 1, wherein said geologic model includes multiple groups of blocks within a zone where each group comprises blocks having similar geologic characteristics.

13. The method of claim 1, wherein said step of comparing comprises the steps of:

computing during each current iteration a calculated multicomponent objective function based on the measures obtained from said steps of forming during that iteration; and comparing the computed multicomponent objective functions for that iteration with the computed multicomponent objective function from a previous iteration.

14. The method of claim 13, wherein said step of comparing comprises:

determining which of the compared multicomponent objective functions has a lower value.

15. The method of claim 14, further including the step of:
replacing the computed multicomponent objective function from the previous iteration if it is larger than the computed multicomponent objective function from the current iteration.

16. The method of claim 1, wherein two or more rock properties may be modeled simultaneously.

17. The method of claim 1, wherein said geologic model includes multiple zones.

18. The method of claim 1, wherein said geologic model includes multiple groups of blocks within a zone where each group comprises blocks having similar geologic characteristics.

19. A method of forming a geologic model of a subsurface earth reservoir of interest, said geologic model being arranged into an assigned number of blocks in a three-dimensional array corresponding to the reservoir, comprising the steps of:

obtaining geologic data from wells in the reservoir;

obtaining seismic survey data in the area of the reservoir;

forming a tentative geologic model by assigning data values to model blocks;

forming synthetic seismic traces based on the assigned model block values;

forming a statistical measure indicative of the match between the synthetic seismic traces and the obtained seismic survey data;

forming measures indicative of the distribution of model block values within the tentative geologic model;

comparing the measures so formed with specified criteria to determine if the degree of agreement is acceptable;

retaining the current tentative geologic model if it is determined acceptable during said step of comparing;

forming a new tentative geologic model by perturbing the model block values within the current tentative geologic model if said current tentative geologic model is determined unacceptable during said step of comparing; and iteratively repeating said steps of forming synthetic seismic traces, forming measures, comparing measures, and retaining or perturbing further until specified limits of acceptability are achieved.

20. The method of claim 19, further including the step of:
forming an output record of the model block values of the acceptable geologic model.

21. The method of claim 19, wherein said step of forming synthetic seismic traces comprises the steps of:

converting the assigned model block values to acoustic velocity and bulk density values;

forming a measure of acoustic impedance for the model blocks based on the acoustic velocity and bulk density values;

determining reflection coefficients at upper and lower faces of the model blocks based on the acoustic impedance measure; and convolving a seismic pulse with the reflection coefficients.

22. The method of claim 19, wherein said step of forming synthetic seismic traces is performed in a programmed digital computer.

23. The method of claim 19, wherein said step of comparing comprises the steps of:

computing during each current iteration a calculated multicomponent objective function based on the measures obtained from said steps of forming during that iteration; and comparing the computed multicomponent objective functions for that iteration with the computed multicomponent objective function from a previous iteration.

24. The method of claim 19, wherein the geologic data obtained from wells includes lithofacies data.

25. The method of claim 19, wherein the geologic data obtained from wells includes porosity data.

26. The method of claim 21, wherein the acoustic velocity and bulk density values are obtained taking into account fluid saturation.

27. The method of claim 19, wherein two or more rock properties may be modeled simultaneously.

28. The method of claim 19, wherein said geologic model includes multiple zones.

29. The method of claim 19, wherein said geologic model includes multiple groups of blocks within a zone where each group comprises blocks having similar geologic characteristics.

30. The method of claim 1, wherein said specified criteria include mapped interval-average acoustic velocity.

31. The method of claim 19, wherein the assigned model block values are based in part on the obtained geologic data.

32. The method of claim 19, wherein the synthetic seismic traces include non-zero-offset calculated traces.

* * * * *